United States Patent
Kido et al.

[11] Patent Number: 5,905,922
[45] Date of Patent: May 18, 1999

[54] CAMERA HAVING CAPABILITY OF CHANGING RECORDED MAGNETIC INFORMATION REGARDING FINAL FILM FRAME PRIOR TO REWINDING OF THE FILM

[75] Inventors: Toshihito Kido, Matsubara; Hiroyuki Okada, Izumi, both of Japan

[73] Assignee: Minolta Co., Ltd., Osaka, Japan

[21] Appl. No.: 08/791,698

[22] Filed: Jan. 30, 1997

[30] Foreign Application Priority Data

Jan. 31, 1996 [JP] Japan ................................. 8-014980

[51] Int. Cl.$^6$ .............................. G03B 17/24; G03B 1/00
[52] U.S. Cl. ......................... 396/319; 396/406; 396/410
[58] Field of Search ................................. 396/310, 319, 396/312, 410, 406

[56] References Cited

U.S. PATENT DOCUMENTS

| | | |
|---|---|---|
| 4,973,996 | 11/1990 | Harvey ..................................... 396/315 |
| 5,187,518 | 2/1993 | Kitagawa ................................. 396/319 |
| 5,249,009 | 9/1993 | Tsuru et al. ............................. 396/410 |
| 5,335,029 | 8/1994 | Itoh et al. ................................ 396/311 |
| 5,434,635 | 7/1995 | Goo ........................................ 396/410 |
| 5,555,047 | 9/1996 | Tsuji et al. .............................. 396/319 |

FOREIGN PATENT DOCUMENTS 7-333715  12/1995  Japan.
7-333722  12/1995  Japan.

*Primary Examiner*—Eddie C. Lee
*Attorney, Agent, or Firm*—McDermott, Will & Emery

[57] ABSTRACT

When exposure of the entire film is completed, the time period until rewinding is begun is read from an EEPROM and set in a timer, and the timer is then started. If the switch to change the data recorded before the time period set in the timer elapses is switched to ON, revision mode to rewrite the print number data for the final frame is entered. If the switch to perform revisions is not operated during the time period set in the timer, and the set time period elapses, or if the rewind switch is switched to ON before the time period set in the timer elapses, the film is rewound and camera operation is completed with the completion of rewinding.

20 Claims, 10 Drawing Sheets

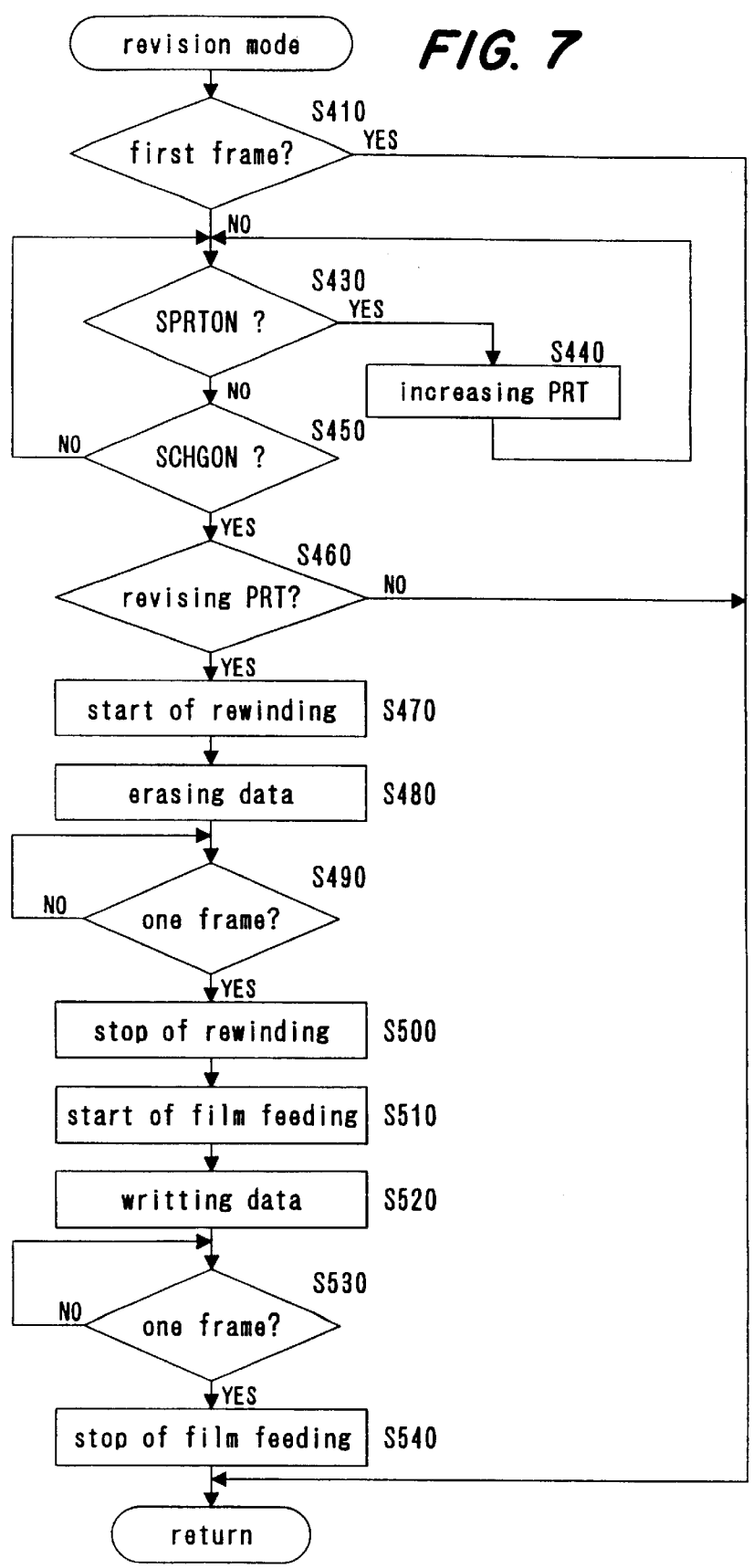

CAMERA HAVING CAPABILITY OF CHANGING RECORDED MAGNETIC INFORMATION REGARDING FINAL FILM FRAME PRIOR TO REWINDING OF THE FILM

BACKGROUND OF THE INVENTION

1. Field of the Invention

The present invention pertains to the conveying of film in a camera that employs strip-shaped film.

2. Description of the Related Art

Conventionally, cameras have existed that automatically rewind the film into a film container such as a film cartridge when the final frame has been exposed. Film whose surface is coated with a magnetic substance and a camera that employs said film and that can record various types of data regarding the exposures have been proposed. Where the recorded data concerns the number of prints, titles, etc., it is desirable if the data can be changed or if input can be performed after photo-taking.

In a conventional camera in which various types of data can be recorded, rewinding of the film by one frame for the purpose of rewriting the data, after the film is fed forward and data recording is performed on the completion of photo-taking, could be made possible through the performance of certain operations prior to photo-taking for the next frame. However, in a camera in which rewinding of the film is begun automatically after the entire film is exposed, when the final frame is exposed, because rewinding of the film is begun immediately after the film is fed forward to perform magnetic recording, the problem exists that revisions of and additions to the data for the final frame cannot be made after the completion of photo-taking.

OBJECT AND SUMMARY

The object of the present invention is to provide a camera that automatically begins rewinding of the film when the entire film has been exposed, and in which revisions, additions and other operations regarding the data for the final frame may be reliably performed after photo-taking for said frame.

The camera of the present invention that automatically performs feeding and rewinding of film has a film conveyance mechanism that feeds the strip-shaped film housed inside a film cartridge onto a spool shaft and that rewinds the film into the film cartridge; an exposure mechanism that performs exposure of the film that is positioned at the exposure position; a detector that detects that photo-taking as to all of the frames of said film has been completed; and a controller that, on detection of the completion of exposure of the entire film by said detector, instructs said film conveyance mechanism to rewind the film into the film cartridge after delaying for a prescribed period.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIG. 7 is a flow chart showing the operation during revision mode.

EMBODIMENT OF THE INVENTION

Figure 1:
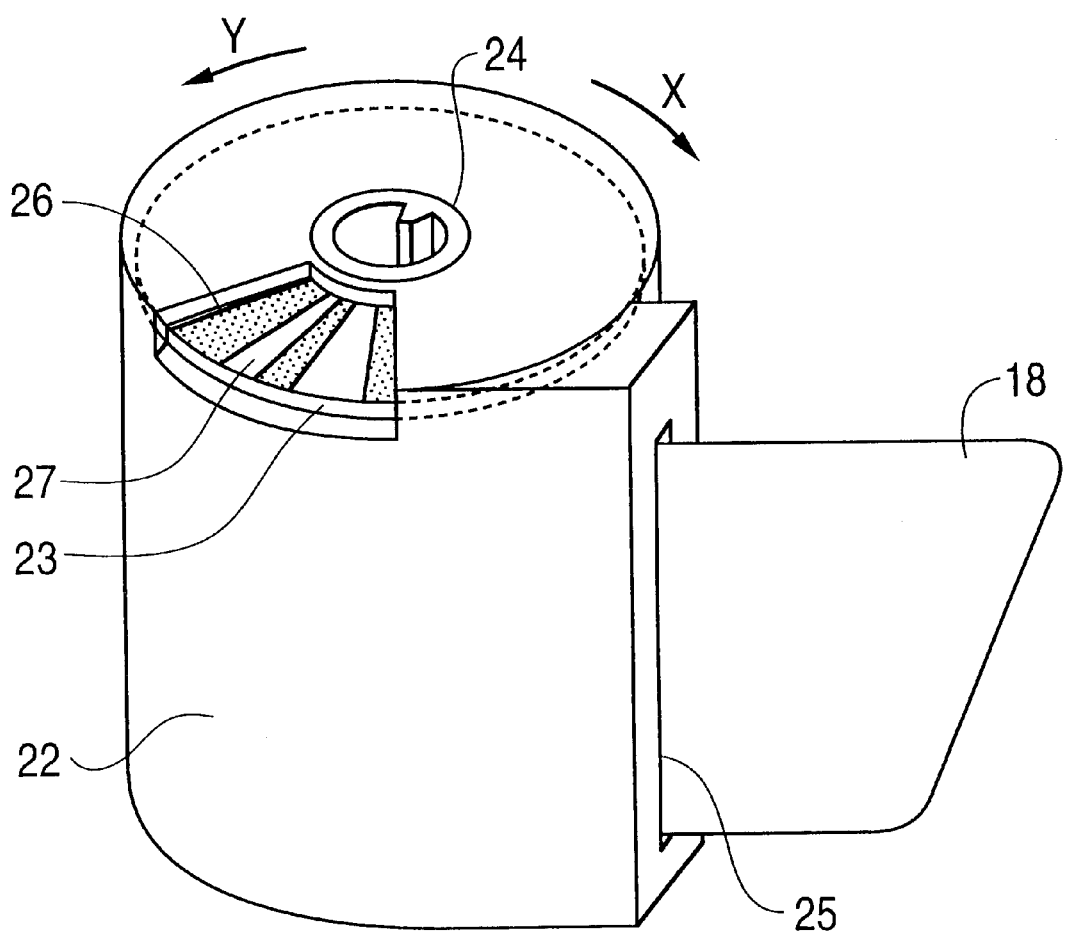
FIG. 1 is a perspective view of a film cartridge.

An embodiment of the present invention will now be explained below with reference to the drawings. FIG. 1 is a perspective view of film cartridge 22 used in a camera in which the present invention is applied. Referring to FIG. 1, film 18 is wound completely inside film cartridge 22 when it is not placed in the camera. When spool 24 is rotated in the Y direction, film 18 is fed out of film inlet/outlet 25 of film cartridge 22. When spool 24 is rotated in the X direction, film 18 is wound into film cartridge 22. Data disk 23 is integrally formed with spool 24 as a single unit, and when spool 24 is rotated, data disk 23 rotates together with it. Part of data disk 23 is exposed to the outside by means of opening 26. Bar code 27 is imprinted on data disk 23.

Opening 26 faces a photoreflector in the camera not shown in the drawing, which allows the bar code 27 on data disk 23 to be read by means of the rotation of spool 24. Information such as the type of film (color/monochrome, print/slide, etc.), the film speed, and the number of frames is encoded in bar code 27.

Figure 2:
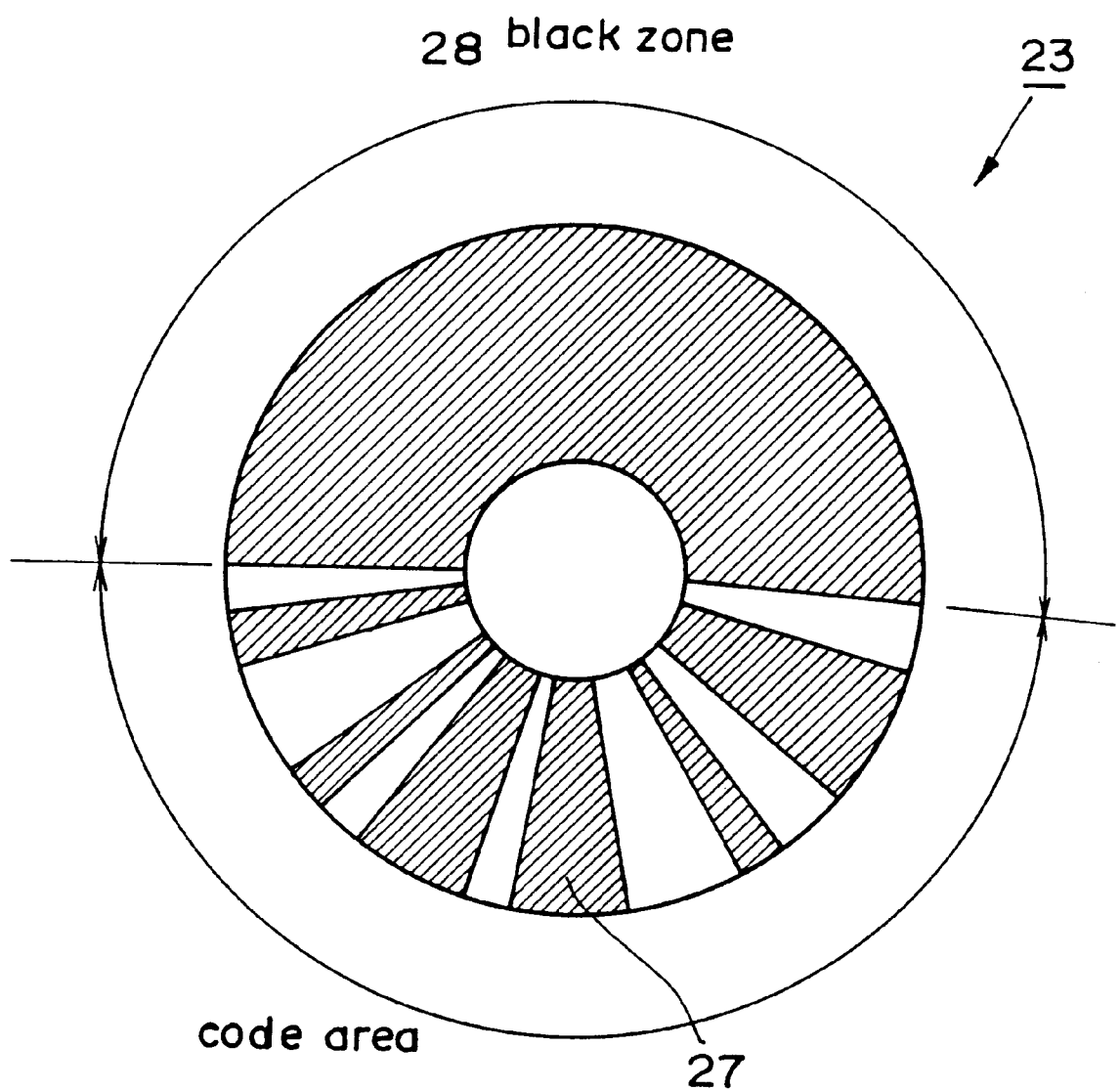
FIG. 2 is a plan view of a data disk.

FIG. 2 is a plan view of data disk 23 shown in FIG. 1. Referring to FIG. 2, bar code 27 on data disk 23 comprises the three areas of black zone 28, code 1 and code 2. Black zone 28 is used in order to detect the start area of the data of bar code 27. Information on the film sensitivity, film type (color/monochrome, print/slide, etc.), and the number of frames is recorded in the code areas.

Figure 3:
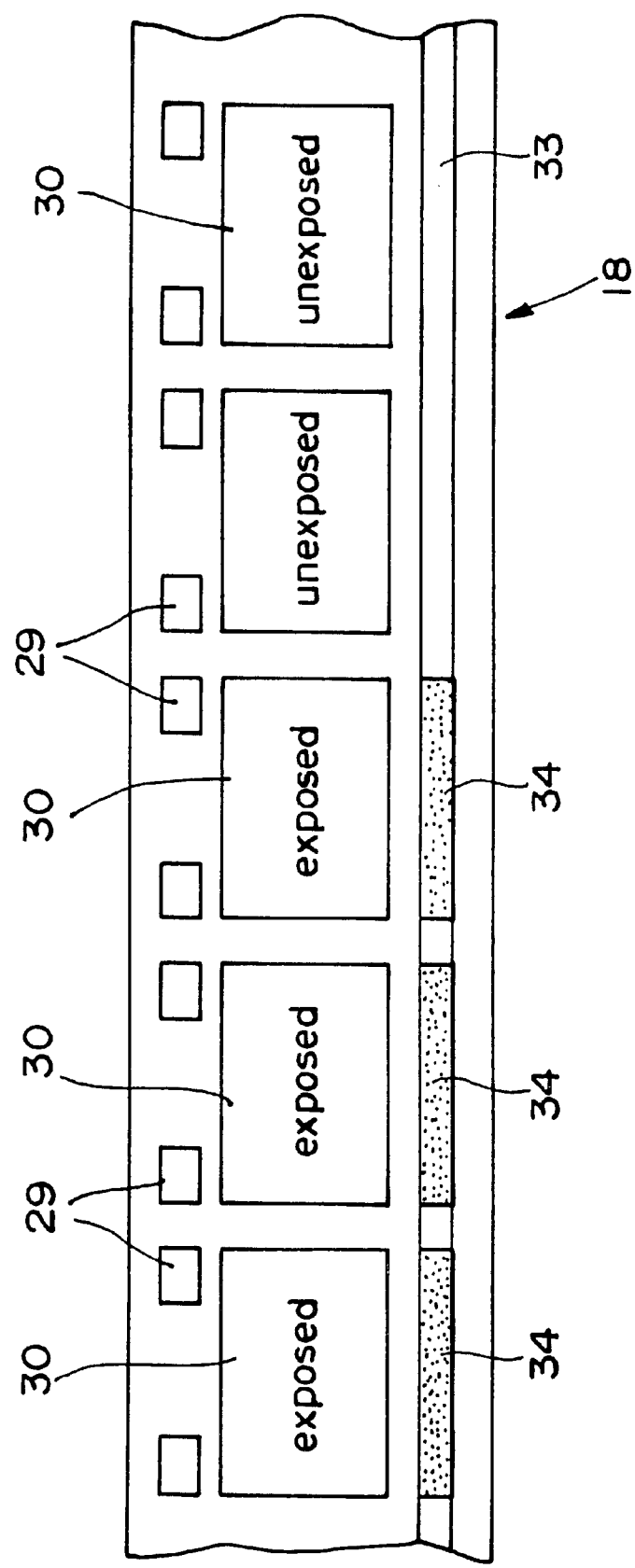
FIG. 3 is a plan view of film.

FIG. 3 is a drawing showing the construction of film 18. Referring to FIG. 3, a pair of perforations 29 is formed in the film correspond to a single exposure frame 30. Magnetic strip 33 is placed continuously below exposure frames 30, and magnetic information 34 described below is written at a position of magnetic strip 33 corresponding to exposure frame 30.

Figure 4:
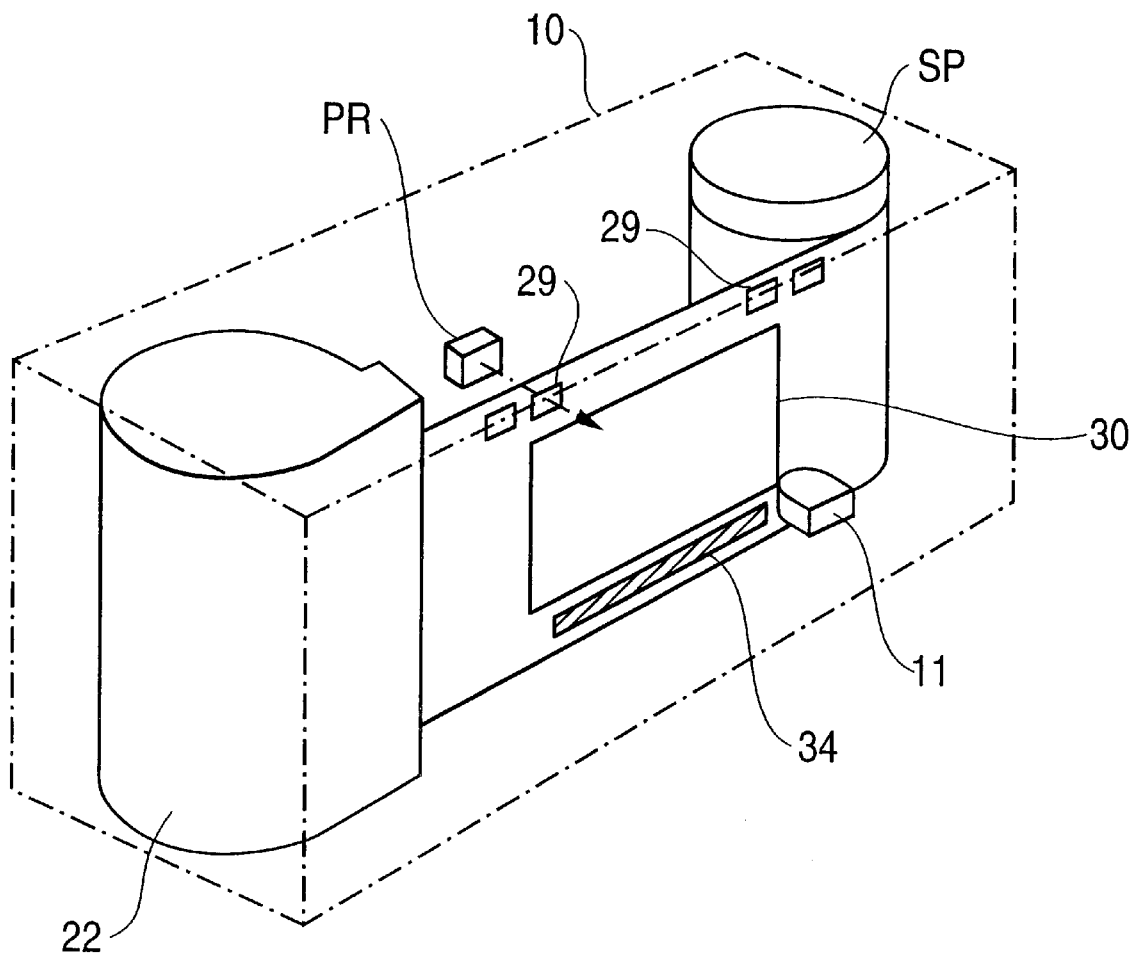
FIG. 4 is a drawing showing the film housed in a camera.

FIG. 4 is a drawing showing the situation in which film 18 is housed in camera 10. Referring to FIG. 4, film 18 drawn out from the film cartridge is wound around spool SP, and perforations 29 are detected by means of photoreflector PR located in camera 10. Feedingcontrol as to film 18 is performed via the detection of perforations 29. Perforations 29 define exposure frame 30, and a magnetic information recording area is located below said exposure frame 30. Magnetic information 34 is recorded on the magnetic information recording area by magnetic head 11. Magnetic information 34 recorded on the magnetic information recording area comprises data on the number of prints.

Figure 5:
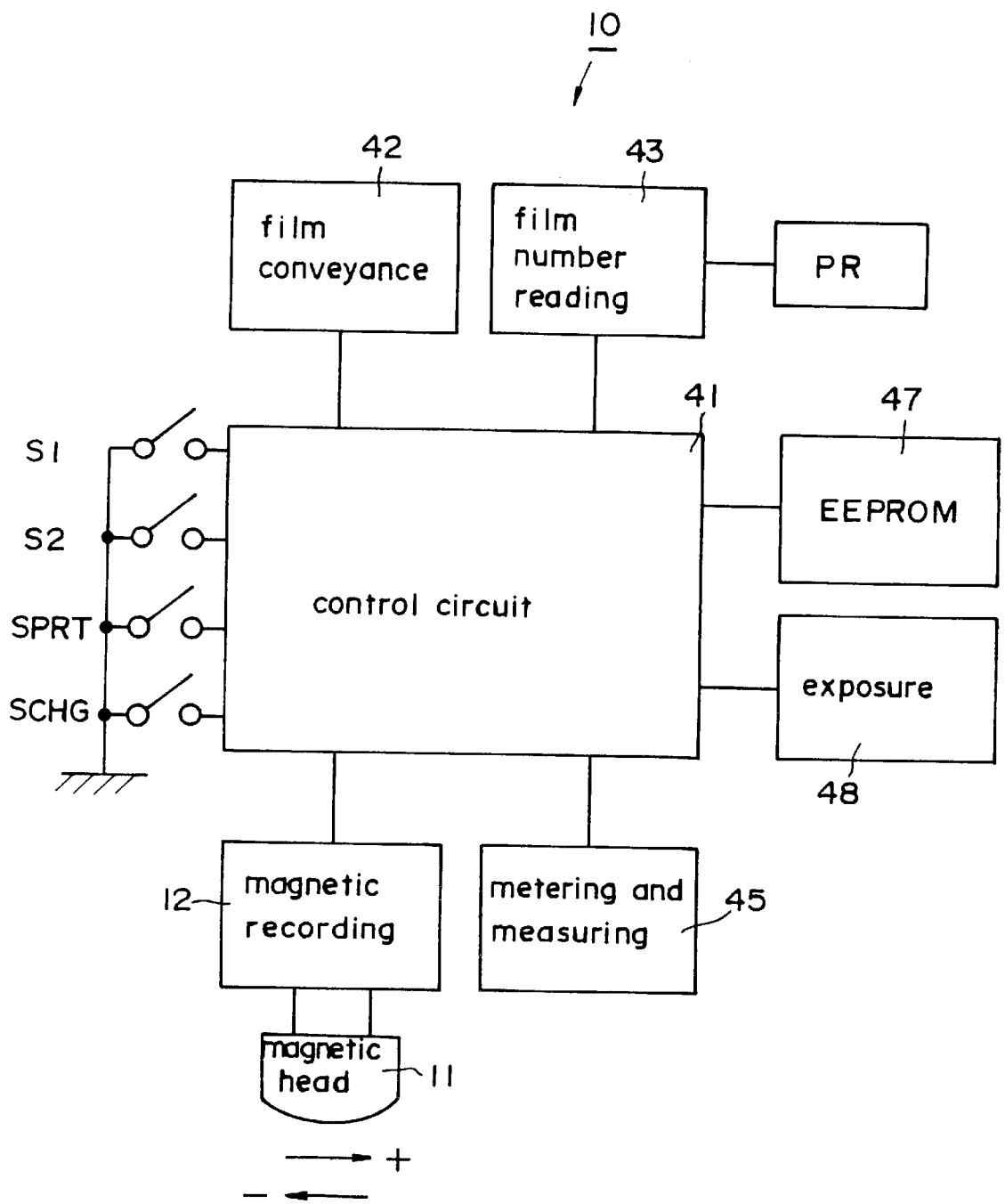
FIG. 5 is a block diagram of a camera pertaining to the present invention.

FIG. 5 is a block diagram pertaining to the control of the camera pertaining to the present invention. However, some of the operations performed by control circuits 41 are not included in the drawing. Referring to FIG. 5, camera 10 includes film conveyance member 42 that performs feeding and rewinding of film 18; exposure frame number reading member 43; EEPROM 47 that comprises a non volatile memory; exposure member 48 that performs exposure of film 18; metering/measuring member 45 that measures the distance to the photo object and the brightness of the photo object; magnetic recording member 12 that performs magnetic recording onto magnetic strip 33 located on film 18; and control circuit 41 that performs control of each of the above members.

Exposure frame number reading member 43 reads, using photoreflector PR, the exposure frame number data on data disk 23 of film cartridge 22 housed in the camera as shown in FIG. 4. EEPROM 47 holds in memory data on the time period between the completion of exposure of the entire film and the beginning of rewinding. Connected to control circuit 41 are switch S1 that drives metering/measuring member 45 to perform light measurement and distance measurement as to the photo object, exposure switch S2 that drives exposure member 48 to begin exposure, print number setting switch SPRT and print number changing switch SCHG. Control of each of said members is performed in response to the operation of said switches. Print number setting switch SPRT is used to set the number of prints to be recorded. Print number changing switch SCHG is used to change the number of prints recorded. When print number setting switch SPRT or print number changing switch SCHG is operated, the number of prints is recorded in the magnetic recording area on film 18 using magnetic head 11.

Figure 6A:
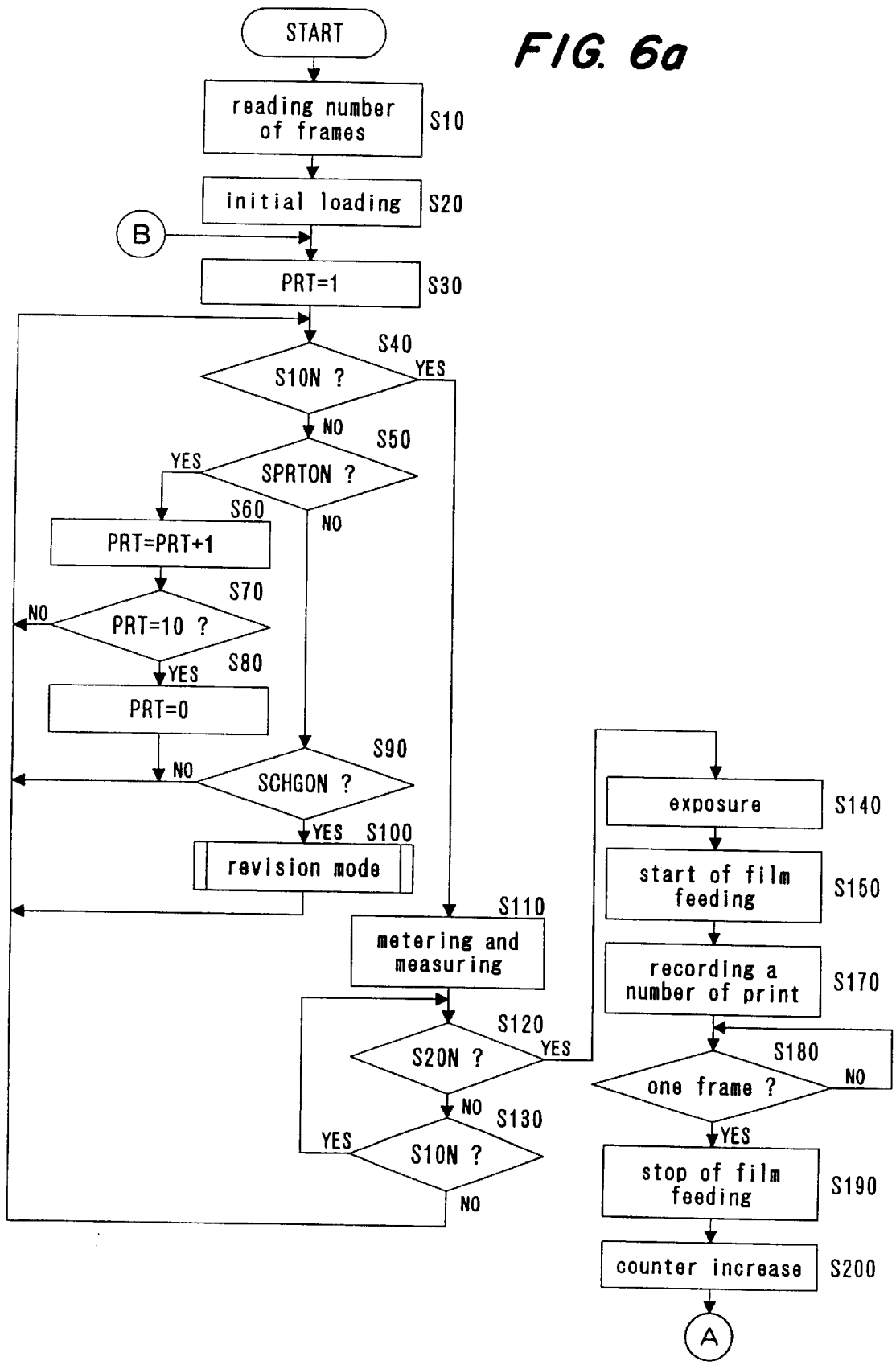
FIGS. 6a and 6b are flow charts showing the operation sequence after the film cartridge is inserted in the camera.
Figure 6B:
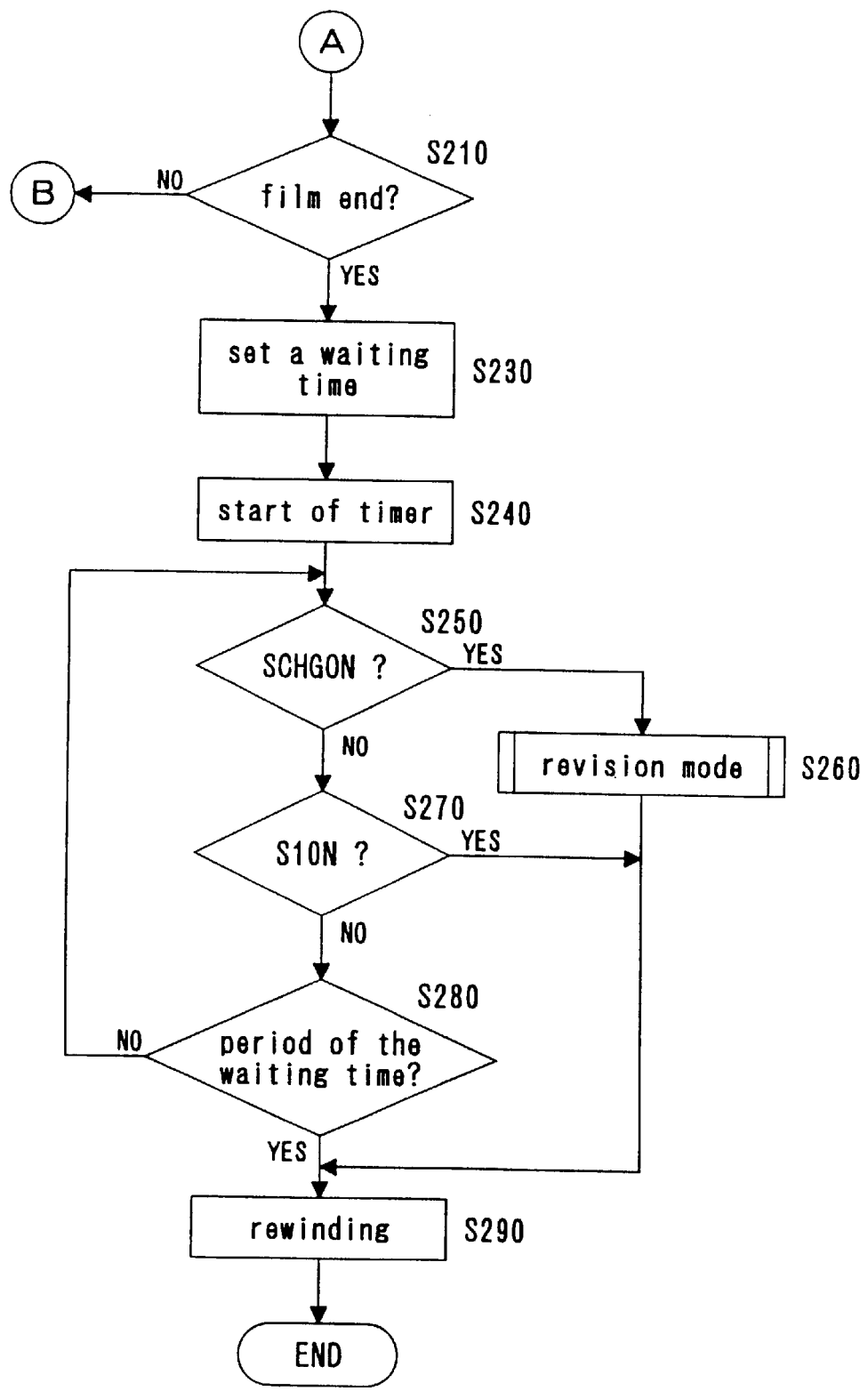

FIGS. 6a and 6b are flow charts showing the operation sequence from the time at which film cartridge 22 is inserted in camera 10 until exposure of entire film 18 is completed. Referring to FIGS. 6a and 6b, the operation sequence of camera 10 is explained below.

After film cartridge 22 is placed in the camera, the operation sequence begins at the 'START' box. First, after the information regarding the number of frames is read from data disk 23 on film cartridge 22, initial loading is performed (steps S10, S20—the word 'step' will be omitted hereinafter).

Number of prints PRT is set at 1 (S30). The program then waits until switches S1, SPRT or SCHG become ON (S40, S50, S90). When switch SPRT becomes ON, number of prints PRT increases by one. When the number of prints becomes 9, the next one becomes 0 (S60, S70, S80).

When switch SCHG becomes ON, revision mode described below to change the number of prints recorded for the previous frame is entered (S100). When switch SI becomes ON, metering and measuring are performed (S110). The program then waits for switch S2 to become ON or for switch S1 to become OFF (S120, S130). When switch S1 becomes OFF, the program returns to S40. When switch S2 becomes ON, exposure is performed and film feeding is then begun (S140, S150). Number of prints PRT is recorded below the photo-taking frame during film feeding (S170). Film feeding is then stopped after the film advances by one frame (S180, S190), and the film counter value is increased by one (S200). The number of exposure frames read in S10 and the current counter value are then compared, and if exposure of the entire film is not completed, the program returns to S30 (S210).

If exposure of the entire film is completed, the amount of time until the beginning of rewinding is read from EEPROM 47 (S230) and set in the timer, which is then started (S240). If switch SCHG becomes ON before the period of time set in the timer has elapsed, the program advances to the revision mode described below in order to rewrite the print number data for the final frame (S250, S260). If switches SCHG or S1 are not operated during the period set in the timer, or if switch S1 becomes ON before the period set in the timer has elapsed, film rewinding is performed and camera operation is completed on the completion of rewinding (S270, S280, S290).

The time data in EEPROM 47 may be rewritten, to change the period of time from completion of film exposure until film rewinding, via the operation of an operation member on camera 10 not shown in the drawings or by means of signals input from a terminal not shown in the drawings. The waiting period until film rewinding is begun is set in advance at five seconds, but it may be increased to as much as one minute or shortened to as little as three seconds. This change of data may concern not changing the time information but simply whether or not the program should wait for a prescribed period of time (approximately five seconds). It is preferable for this waiting period to be set at between approximately three and ten seconds.

The revision mode mentioned above will next be described with reference to FIG. 7. First, it is determined whether the current photo-taking frame is the first frame, and if it is the first frame, because the number of prints data has not yet been recorded, the program returns to the main routine (S410). If it is not the first frame (NO in S410), switches SPRT and SCHG are checked (S430, S450). If switch SPRT is ON, the value of PRT is increased by one (S440). Here, just as in steps S60-S80 described above, when the value of PRT exceeds 9, the next value becomes 0 once again.

If switch SCHG is ON, it is determined whether or not the value of PRT has been revised (YES in S450, S460), and if there is no change, the program returns to the main routine. If there is such a change (YES in S460), rewinding is begun (S470). Rewinding is performed during erasure of the written data, and is stopped after the rewinding by one frame has been completed (S470–S500).

Next, film feeding is begun. The revised print number data PRT is written, and film feeding is stopped after the feeding of one frame has been completed (S510–S540).

In the embodiment described above, when film rewinding is to be begun after the final frame of film is detected, exposure of that frame is performed and input of magnetic recording data is completed, the beginning of the rewinding can be delayed for a prescribed period of time. Because the beginning of rewinding after the final frame can be delayed for a prescribed period of time, revisions of and additions to the magnetic data for the final frame can be reliably made after exposure of the entire film has been completed.

Figures 8A, 8B, 8C:
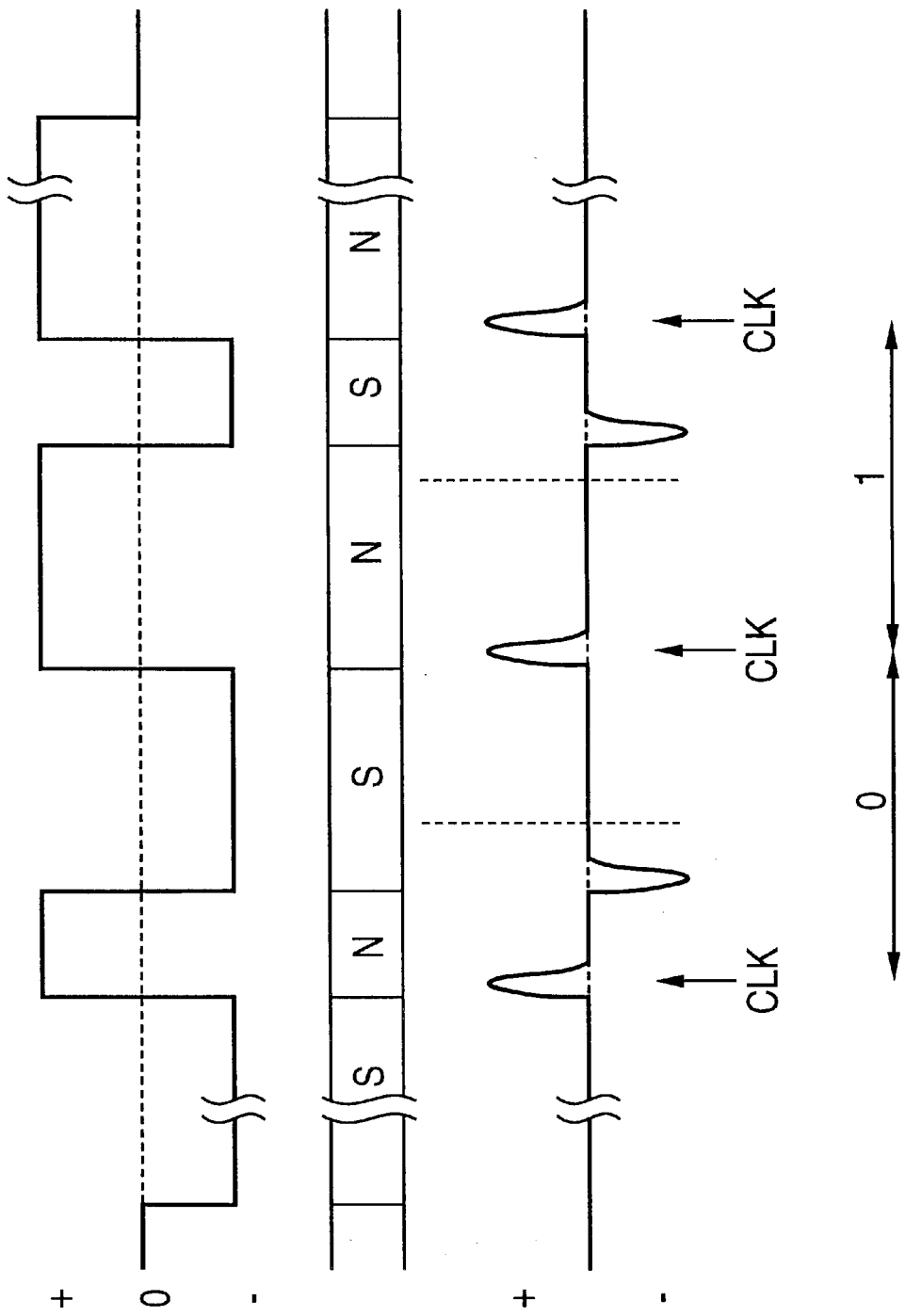
FIGS. 8a, 8b, and 8c are drawings showing the recording signals, the magnetization state of the film and the regenerated signals.

The magnetic recording procedure will now be specifically explained. FIG. 8 comprises drawings showing the recording signals (a), the state of magnetization of the film (b), and the regenerated signals that correspond to the recording signals (c).

Prior to the beginning of magnetic data recording, magnetic recording circuit 12 first sends current in a prescribed direction (−) to magnetic head 11. When this is done, the magnetic substance on film 18 is magnetized in a prescribed direction (S). When the direction of current is reversed (+), the direction of magnetization is changed as well (N).

The recording signals are regenerated at the developing laboratory. When the state of magnetization of film 18 changes from S to N, a signal is generated on the plus side, and when said state changes from N to S, a signal is generated on the minus side. The signal output on the plus side is deemed the reference signal, and depending on whether the signal output on the minus side is in front of or behind the center point between two reference signals that sandwich said signal, '0' or '1' is recognized.

Figure 9:
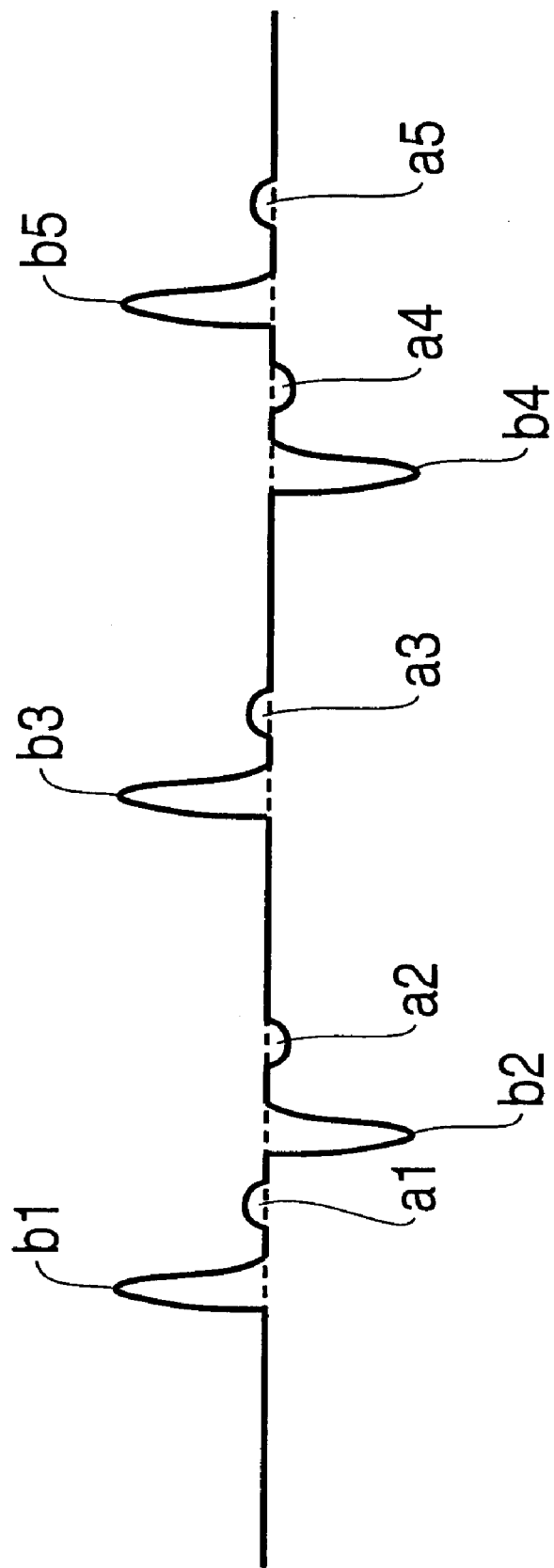
FIG. 9 is a drawing showing the magnetic recording state.

FIG. 9 is a drawing showing the state of magnetic recording onto magnetic strip 33. Referring to FIG. 9, the state of magnetic recording will be explained below.

Erasure of the previously written signals is performed by re-recording signals over the recorded area. However, due to a reduction in battery voltage, etc., the previously written signals (the signals to be erased) might not be completely erased, and during regeneration, they may appear to some extent on areas where there should be no signals, leading to errors.

Therefore, in the present invention, when data rewriting is carried out, rewinding is performed by sending current in a prescribed direction to magnetic head 11, and then performing writing of signals while film feeding is performed. In this way, erasure of recorded data is performed twice, i.e., during rewinding and during rewriting. As a result, problems arising from incomplete erasure of data may be prevented. In other words, through the recording method described above, the previous recording signals a1 through a5 shown in FIG. 9 are erased, and new signals b1 through b5 are reliably recorded onto magnetic strip 33. In this way, problems arising due to incomplete erasure of data may be prevented.

In the above embodiment, the only magnetic recording data recorded onto magnetic strip 33 consists of data on the number of prints. But it may also comprise the photo-taking conditions, photo-taking format or comments on the photographed scene. Further, in the above embodiment, rewinding is immediately begun when switch S1 becomes ON during the delay period in which rewinding is being delayed.

But in a camera having a switch to instruct rewinding before exposure of the entire film is completed, immediate rewinding may be begun by activating this rewind switch.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A camera employing film having a plurality of frames and a magnetic information recording area comprising:
    an exposure mechanism for executing the exposure of said film;
    a film conveyance mechanism for feeding said film from a film cartridge and rewinding said film into the film cartridge;
    a magnetic recording head for recording magnetic information onto said magnetic information recording area of said film;
    a write control for controlling the magnetic recording head so that prescribed information pertaining to an exposed frame is recorded onto said film in response to the completion of exposure of each frame by said exposure mechanism;
    a rewrite control for controlling the magnetic recording head so as to rewrite the prescribed information recorded onto the frame immediately preceding the exposed frame by said write control;
    a film counter for detecting the recording of the final frame of said film by said write control; and
    a controller for controlling said film conveyance mechanism to rewind the film after delaying for a set prescribed period after detecting the recording of the final frame by said film counter, said set prescribed period being sufficient to direct operation of the rewrite control after detecting the recording of the final frame of said film and before the controller for controlling said film conveyance mechanism directs rewinding of the film.

2. A camera as claimed in claim 1 further comprising:
    an operation switch for instructing the rewrite control, wherein said rewrite control begins the rewriting operation when the instruction of the rewinding operation is issued by said operation switch during the prescribed period of delay.

3. A camera as claimed in claim 1 further comprising:
    a switch for instructing the rewinding of film wherein when the instructing switch is operated during the prescribed period, the film conveyance mechanism begins immediate rewinding of the film.

4. A camera as claimed in claim 1 further comprising:
    a manual switch for changing the prescribed period of said controller.

5. A camera as claimed in claim 1 wherein said write control controls the magnetic recording head to write while the film conveyance mechanism feeds immediately after exposure.

6. A camera as claimed in claim 5 further comprising;
    an instruction switch for instructing a revision of the recorded information, wherein when a revision is instructed by said instruction switch, the rewrite control instructs the film conveyance mechanism to rewind the film by one frame, the magnetic recording head to erase the magnetic information during said rewinding, thereafter the film conveyance mechanism to feed the film and the magnetic recording head to write information during said feeding.

7. A camera as claimed in claim 1 wherein said prescribed period of delay is between approximately three and ten seconds.

8. A camera as claimed in claim 7 wherein said prescribed period of delay is initially set at five seconds.

9. A camera as claimed in claim 1 wherein said prescribed information pertaining to the exposed frame is a number of printing.

10. A camera which automatically feeds and rewinds film having a plurality of frames and a magnetic recording area for recording changeable magnetic information corresponding to each frame, comprising:
    a film conveyance mechanism for feeding film containing a plurality of frames from a film cartridge and rewinding the film into the film cartridge;
    a magnetic recording mechanism for recording and changing the changeable magnetic information;
    an exposure mechanism for exposing the film which is positioned at an exposure position;
    a detector for detecting that photo-taking has been completed wherein all of the frames of said film have been used; and
    a controller for controlling said film conveyance mechanism to rewind the film into the film cartridge after delaying for a set prescribed period, on detection by said detector that all the frames of said film have been used, said set prescribed period being sufficient to direct an operation to change the changeable magnetic information corresponding to the last frame of the film after detecting that all the frames of said film have been used and before the controller for controlling said film conveyance mechanism directs rewinding of the film.

11. A camera as claimed in claim 10 further comprising:
a switch for instructing the rewind of film wherein the film conveyance mechanism begins immediate rewinding of the film when the switch is operated during the prescribed period.

12. A camera as claimed in claim 10 further comprising:
a manual switch for changing the prescribed period of delay of said controller.

13. A camera as claimed in claim 10 wherein said prescribed period of delay is initially set at between approximately three and ten seconds.

14. A camera as claimed in claim 10, wherein said magnetic recording mechanism further comprises:
a recording head for recording information pertaining to an exposed frame onto said film during the feeding of the film.

15. A camera as claimed in claim 14 further comprising:
a revision manager for instructing the recording head so as to revise of the information which is recorded onto the immediately preceding exposure frame.

16. A camera as claimed in claim 15 wherein the revision manager instructs the film conveyance mechanism to rewind the film by one frame, the recording head to erase the information during said rewinding, thereafter the film conveyance mechanism to feed the film and the recording head to record revised information during said feeding.

17. A camera as claimed in claim 15 wherein when the revision manager instructs the recording head to revise the information during the prescribed delay period, the recording head records revised information as to the final frame of the film.

18. A camera as claimed in claim 14 wherein said detector detects both exposure by the exposure mechanism and information from the recording head as to all of the frames of said film, which have been completed.

19. A control method used in a camera which uses a film having a plurality of frames and a magnetic recording area comprising:
a step of conveying a film frame to an exposure position;
a step of exposing the frame of the film which is positioned at the exposure position;
a step of recording changeable prescribed information pertaining to the exposed frame onto a magnetic recording area of the film;
a step of detecting when recording of the final frame of the film has been completed;
a step of counting a set prescribed period of time after detecting when recording of the final frame of the film has been completed;
a step of conveying the film in a direction opposite to said conveyance direction after counting the set prescribed period of time,
said set prescribed period of time being sufficient to direct carrying out a step of changing the changeable prescribed information pertaining to the exposed final frame of the film after detecting when recording of the final frame of the film has been completed and before the step of conveying the film in a direction opposite to said conveyance direction is carried out.

20. A control method used in a camera as claimed in claim 19 further comprising:
a step of revising the recorded prescribed information, wherein this step is performed, when a revision switch is operated.

* * * * *